(12) United States Patent
Fanzani (10) Patent No.: US 11,326,483 B2
(45) Date of Patent: May 10, 2022

(54) DOUBLE SLOPE STOPPER USABLE WITH A VARIABLE CAM TIMING SYSTEM

(71) Applicant: BorgWarner Inc., Auburn Hills, MI (US)

(72) Inventor: Augusto Fanzani, Gessate (IT)

(73) Assignee: BorgWarner Inc., Auburn Hills, MI (US)

(*) Notice: Subject to any disclaimer, the term of this patent is extended or adjusted under 35 U.S.C. 154(b) by 335 days.

(21) Appl. No.: 16/710,585

(22) Filed: Dec. 11, 2019

(65) Prior Publication Data

US 2020/0191024 A1 Jun. 18, 2020

Related U.S. Application Data

(60) Provisional application No. 62/779,876, filed on Dec. 14, 2018.

(51) Int. Cl.
*F16K 15/14* (2006.01)
*F01L 1/344* (2006.01)
*F16K 15/16* (2006.01)

(52) U.S. Cl.
CPC ........... *F01L 1/3442* (2013.01); *F16K 15/16* (2013.01); *F01L 2001/3444* (2013.01); *F01L 2001/34433* (2013.01)

(58) Field of Classification Search
CPC .......... F01L 1/3442; F01L 2001/34433; F01L 2001/3444; F16K 15/16
See application file for complete search history.

(56) References Cited

U.S. PATENT DOCUMENTS

| | | | |
|---|---|---|---|
| 5,462,253 A | 10/1995 | Asthana et al. | |
| 6,705,260 B2 | 3/2004 | Lewis et al. | |
| 7,779,859 B2 | 8/2010 | Denike et al. | |
| 9,309,979 B2 | 4/2016 | Russell | |
| 9,488,077 B2* | 11/2016 | Suzuki | F01L 1/3442 |
| 2012/0234408 A1 | 9/2012 | Tornquist et al. | |
| 2016/0146362 A1 | 5/2016 | Solarz | |
| 2018/0100595 A1 | 4/2018 | Fanzani et al. | |
| 2018/0128388 A1 | 5/2018 | Ferus et al. | |

FOREIGN PATENT DOCUMENTS

WO 2013011348 A1 1/2013

* cited by examiner

*Primary Examiner* — P. Macade Nichols
(74) *Attorney, Agent, or Firm* — Brown & Michaels, PC (57) ABSTRACT

A check valve for controlling the flow of a fluid into a variable camshaft timing phaser.

9 Claims, 12 Drawing Sheets

DOUBLE SLOPE STOPPER USABLE WITH A VARIABLE CAM TIMING SYSTEM

BACKGROUND OF THE INVENTION

Field of the Invention

The invention pertains to the field of flapper valves. More particularly, the invention pertains to a double slope stopper used with a double flapper valve for a variable cam timing system.

Description of Related Art

Internal combustion engines have employed various mechanisms to vary the relative timing between the camshaft and the crankshaft for improved engine performance and/or reduced emissions. The majority of these variable camshaft timing (VCT) mechanisms use one or more "vane phasers" on the engine camshaft (or camshafts, in a multiple-camshaft engine). Vane phasers have a rotor with one or more vanes, mounted to the end of the camshaft, surrounded by a housing assembly with the vane chambers into which the vanes fit. It is possible to have the vanes mounted to the housing assembly, and the chambers in the rotor assembly, as well. The housing's outer circumference forms the sprocket, pulley or gear accepting drive force through a chain, belt, or gears, usually from the crankshaft, or possibly from another camshaft in a multiple-cam engine.

Apart from the camshaft torque actuated (CTA) variable camshaft timing (VCT) systems, the majority of hydraulic VCT systems operate under two principles, oil pressure actuation (OPA) or torsion assist (TA). In the oil pressure actuated VCT systems, an oil control valve (OCV) directs engine oil pressure to one working chamber in the VCT phaser while simultaneously venting the opposing working chamber defined by the housing assembly, the rotor assembly, and the vane. This creates a pressure differential across one or more of the vanes to hydraulically push the VCT phaser in one direction or the other. Neutralizing or moving the valve to a null position puts equal pressure on opposite sides of the vane and holds the phaser in any intermediate position. If the phaser is moving in a direction such that valves will open or close sooner, the phaser is considered to be advancing and if the phaser is moving in a direction such that valves will open or close later, the phaser is considered to be retarding.

The torsional assist (TA) systems operate under a similar principle with the exception that they have one or more check valves to prevent the VCT phaser from moving in a direction opposite the direction being commanded to move, should it incur an opposing force such as a torque impulse caused by cam operation.

Prior art inlet check valves for variable cam timing systems generally include a single opening and a ball check valve.

SUMMARY OF THE INVENTION

An inlet check valve controls the flow of a fluid into a variable camshaft timing phaser. In an embodiment of the present invention, the inlet check valve includes: a housing; a flapper valve coupled to the housing and having at least two flexible flaps with each flap including a wing portion; a valve seat coupled to the housing and spaced apart from the flapper valve, the valve seat including at least two openings that align respectively with the at least two wings of the at least two flaps; a stopper piece coupled to the housing and spaced apart from both the flapper valve and the valve seat such that the flapper valve is disposed between the valve seat and the stopper piece, the stopper piece including at least two stoppers each having a sloped configuration with a first sloped surface and a second sloped surface, the second sloped surface being raised from and extending from the first sloped surface to a position adjacent a respective wing of the at least two flexible flaps such that the second sloped surface of each stopper contacts the respective wing after a predetermined amount of movement of the at least two flexible flaps.

In an exemplary embodiment, the stopper piece is integrally formed with the housing via an overmold process.

In another exemplary embodiment, the stopper piece is formed separately from the housing.

DETAILED DESCRIPTION OF THE INVENTION

In the following description, reference is made to the accompanying drawings that form a part thereof, and in which is shown by way of illustration specific example embodiments in which the present teachings may be practiced. These embodiments are described in sufficient detail to enable those skilled in the art to practice the present teachings and it is to be understood that other embodiments may be utilized and that changes may be made without departing from the scope of the present teachings.

The terminology used herein is for the purpose of describing particular example embodiments only and is not intended to be limiting. As used herein, the singular forms "a", "an", and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Spatially relative terms, such as "inner," "outer," "beneath", "below", "lower", "above", "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

A control valve for a variable cam timing device includes an inlet check valve comprising a flapper valve with two flaps which are preferably limited by stoppers. In some embodiments, such stoppers are part of a valve housing, which is preferably made by an overmolding process. In other embodiments, the stoppers are part of a separate stopper piece and the valve housing is preferably made separately by an overmolding process. Other processes, including but not limited to, other injection molding processes, may alternatively be used to make the housing or other components.

Using a double flapper valve as the inlet check valve in a variable cam timing system results in significant benefits, such as a smaller package, better performance, and lower cost in comparison with prior art check valves.

A double flapper valve permits high flow passage for a variable cam timing device. The double flapper valve acts as the inlet check valve for the variable cam timing device. The double flapper valve opens the oil inlet passage of a valve seat and the stroke of the valve is stopped when the flappers hit a respective stopper. The flapper valve is somewhat similar to shim valves used in shock absorbers for motorcycles or cars, but the present inventive concept as described herein uses two flaps instead of a single shim. More specifically, the double flapper valve of the present inventive concept uses a shim to open/close two oil passages instead of traditional valves that use a single passage that can be opened and closed by a sphere, ball, or disk. The double flapper valve of the present inventive concept improves the passage of inlet oil coming from a cam nose to a sleeve.

While the flapper check valve assembly is shown as an inlet check valve, the check valve assembly can be located anywhere within a hydraulic system.

In an exemplary embodiment, a one piece housing and the flapper valve assembly can be provided. In an alternative exemplary embodiment, a filter can be added to the back of a double flapper valve to prevent contamination. A valve housing can include stoppers that are integrally formed therein to limit the stroke of the flaps of the flapper valve. The stoppers may alternatively be included as a valve assembly piece separate from the housing. The housing is preferably made using an overmolding process.

There are preferably two flapper valves in the flapper valve assembly according to an exemplary embodiment, with a flow of approximately two to three times the flow of prior art inlet check valves. In the preferred embodiment, the flapper valves have a total passage of oil of about 40 mm$^2$. In contrast, prior art check valves with a ball diameter of 6.0 mm have a passage of oil of about 14.6 mm$^2$.

In some embodiments, the flapper valve is preferably assembled within a housing, which is preferably made by an overmolding process. As pointed out above, the valve assembly housing can include two stoppers to limit the stroke of the two flaps of the valve at 1.3 mm. With this stroke, the opening passage is about 40 mm$^2$.

In various preferred embodiments, the housing can be made of plastic, or plastic and fiber glass (e.g. ~50% fiberglass). In some preferred embodiments, the double flapper valve and/or the filter can be made of steel. In some preferred embodiments, the valve seat can be made of steel. In example embodiments using a separate stopper piece, the stopper piece with the stoppers can be made of steel.

Figure 1:
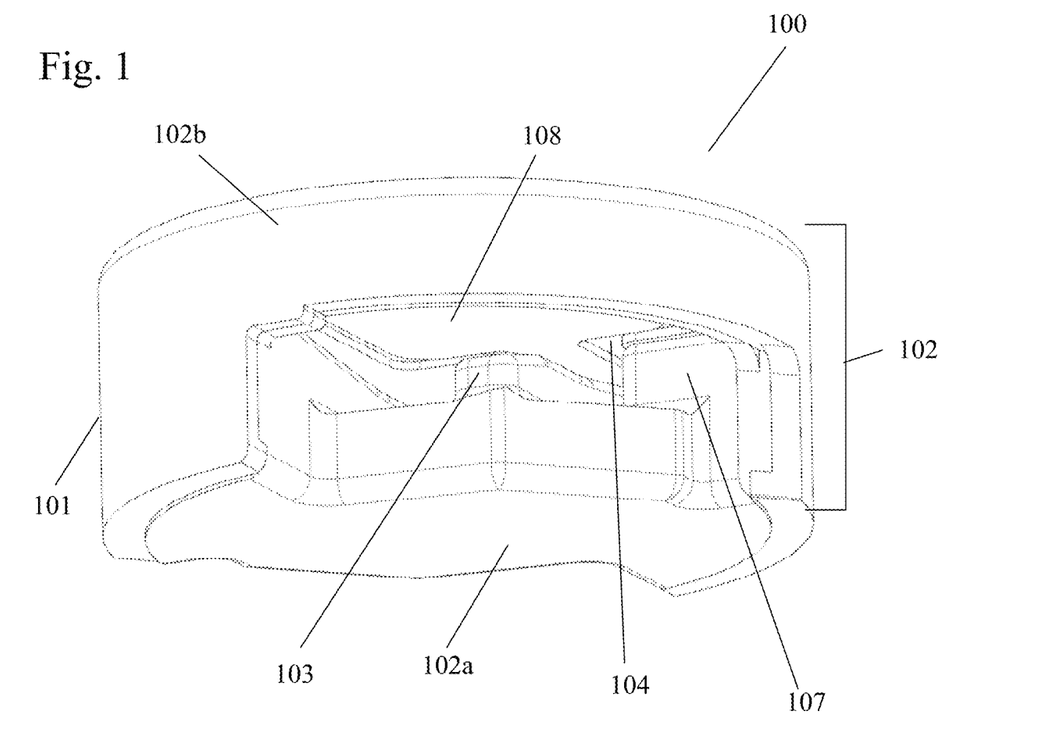
FIG. 1 illustrates an isometric view of a double flapper valve assembly according to an exemplary embodiment of the present inventive concept.

An exemplary embodiment of a double flapper check valve assembly 100 is illustrated in FIG. 1. The double flapper check valve assembly 100 is used to control fluid into a variable camshaft timing phaser (not illustrated to provide brevity of this application). As illustrated in FIG. 1, a housing 102 includes a first housing portion 102a and a second housing portion 102b. As will described in more detail below, the housing 102 can include a body 107 formed in the first housing portion 102a. A stopper piece including a pair of stoppers 103 (see FIG. 3) can be formed into the body 107 of the housing 102. The stoppers 103 are designed to limit movement of respective flexible flaps 108 (see FIG. 3). The housing 102 also includes a lip 101 that surrounds all of the components of the double flapper check valve assembly 100.

Figure 2A:
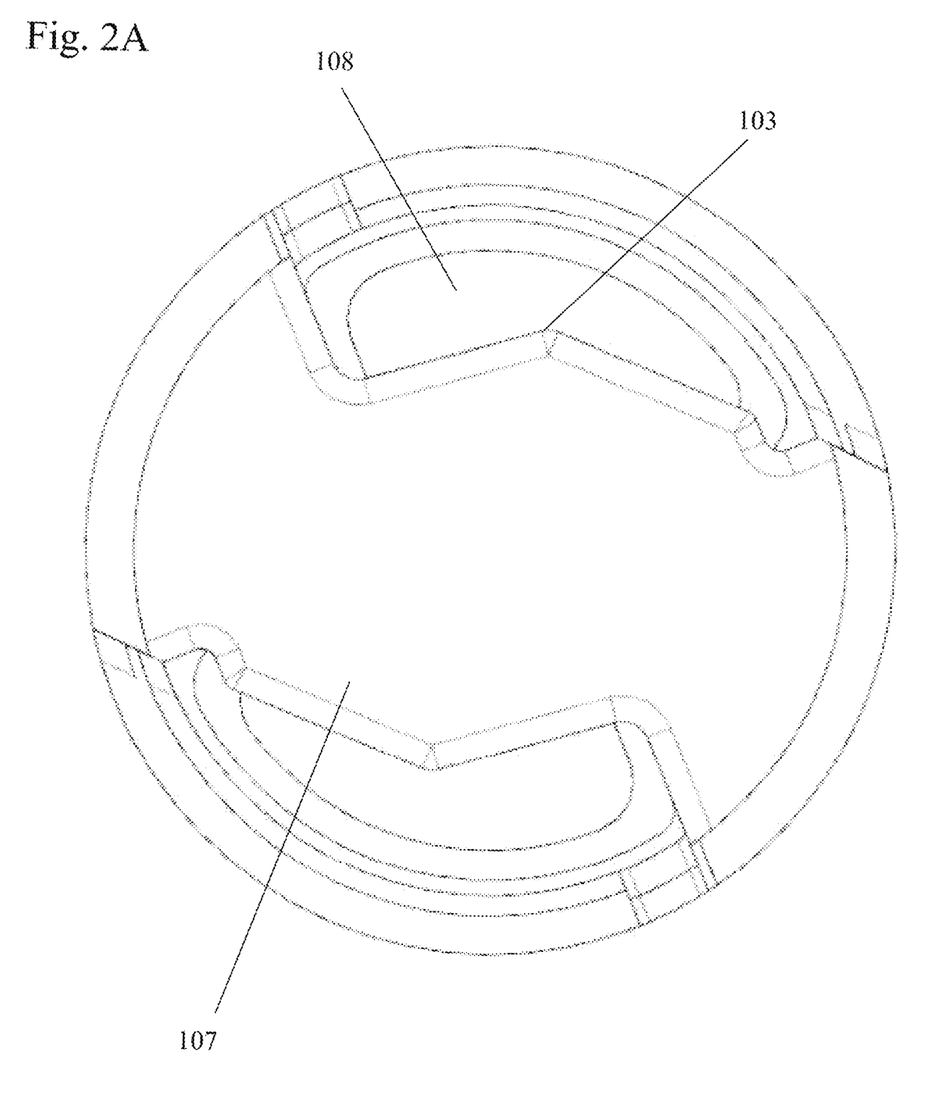
FIG. 2A illustrates a bottom isometric view of the double flapper valve assembly according to the exemplary embodiment of FIG. 1.

FIG. 2A illustrates an isometric bottom view of the double flapper valve assembly 100 of FIG. 1. From this view, the body 107 is visible.

Figure 2B:
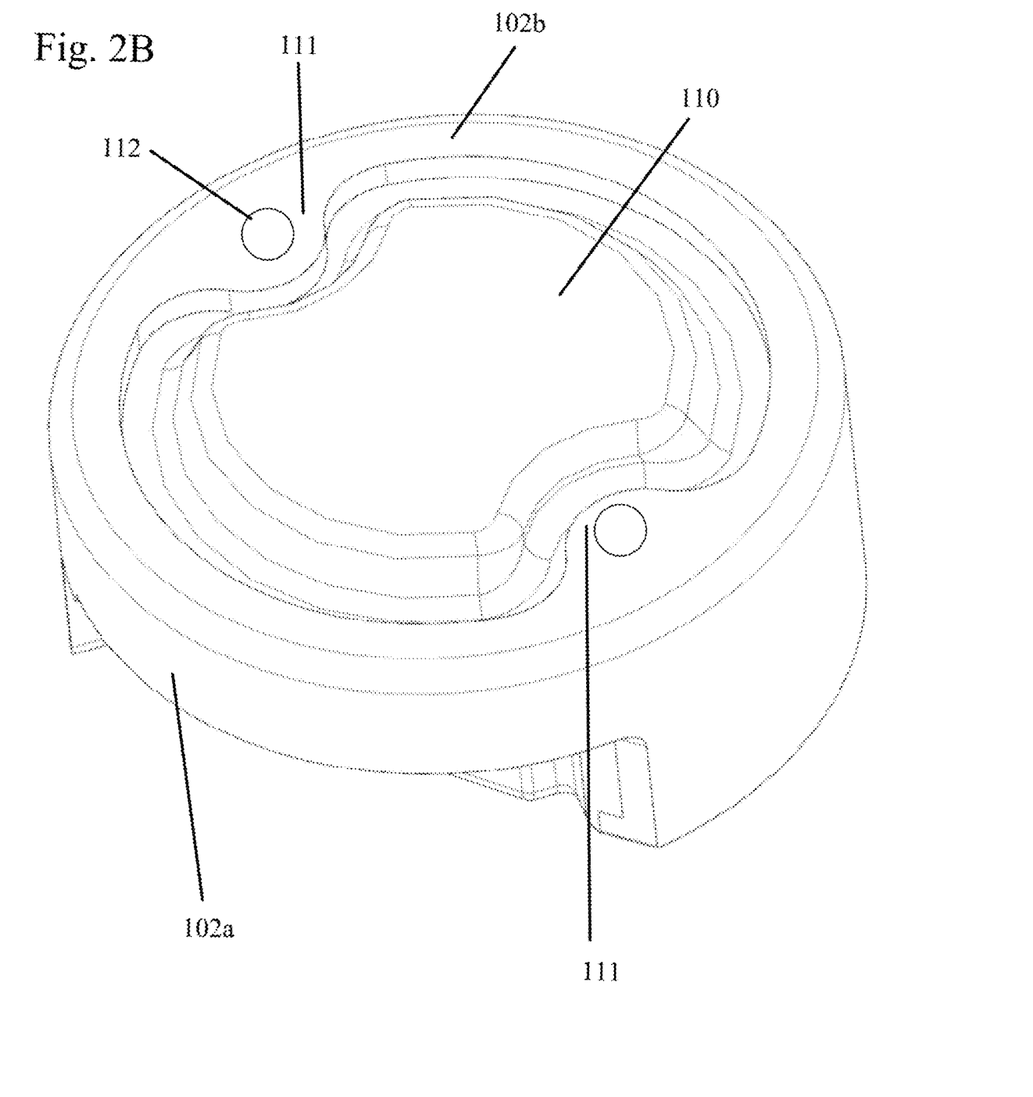
FIG. 2B illustrates a top isometric view of the double flapper valve assembly according to the exemplary embodiment of FIG. 1.

FIG. 2B illustrates an isometric top view of the double flapper valve assembly 100. As illustrated in FIG. 2B, the top view shows an exposed filter 110 as the topmost component of a plurality of components within the housing 102. The second housing portion 102b fits over an outer periphery of the filter 110 and includes two extension portions 111 projecting inward from an outer periphery of the second housing portion 102b. Each extension 111 includes a hole 112 that extends completely through the respective extension 111 to receive a respective protrusion 107a, 107b, as will be described in more detail below.

Referring back to FIGS. 2A and 3, the back side of a pair of stoppers 103 are illustrated to be formed into the body 107 and extend away from the body 107 in a direction facing the second housing portion 102b. The stoppers 103 can be integrally formed with the body 107 during an overmolding process. Alternatively, the stoppers 103 can be formed on a stopper piece separate from the body 107, and then added to the first housing portion 102a above the body 107.

Figure 3:
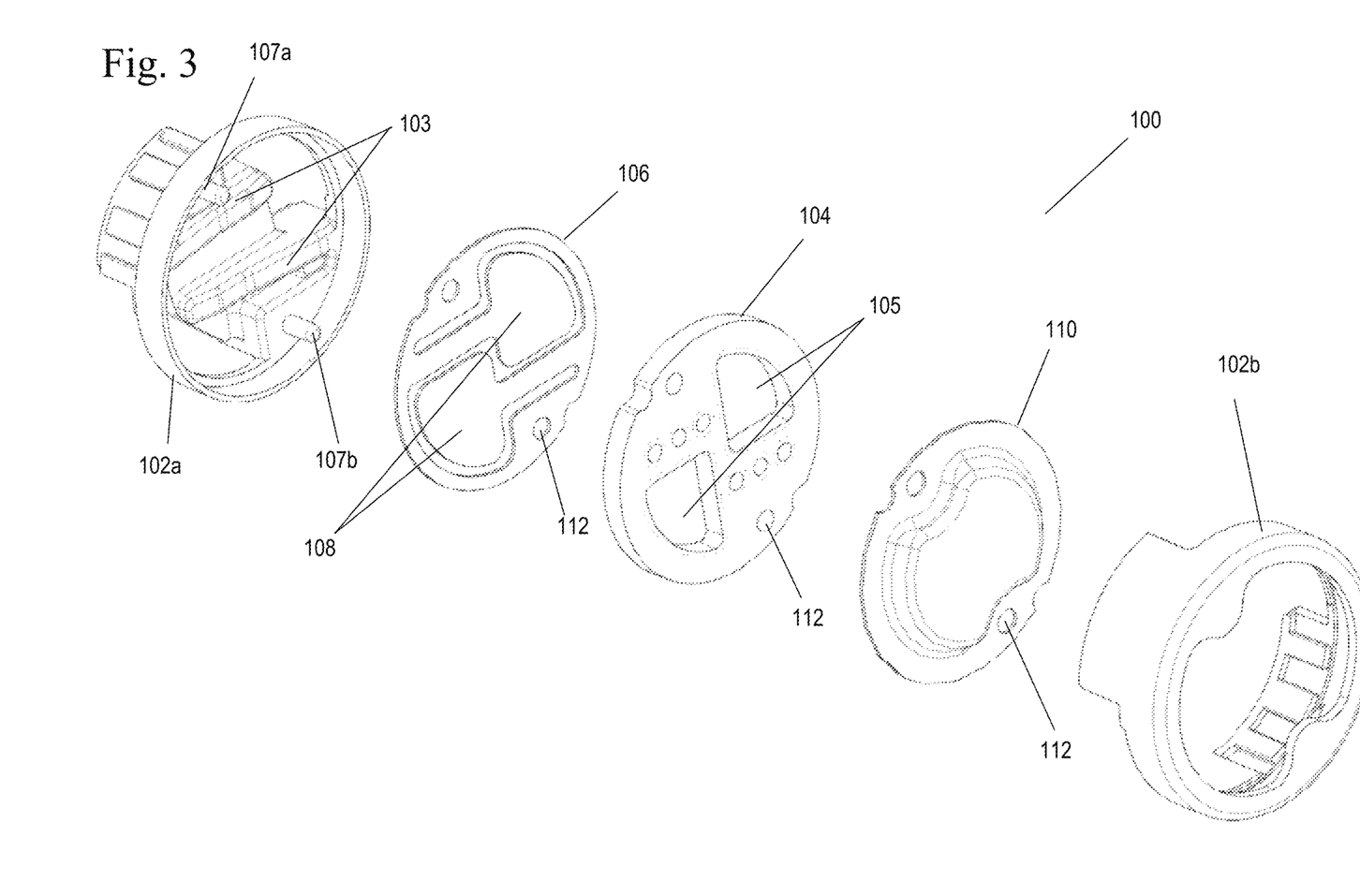
FIG. 3 illustrates an exploded view showing components of the double flapper valve assembly according to the exemplary embodiment of FIG. 1.

Referring to FIG. 3, the stoppers 103 are illustrated to be formed as part of the body 107 and are provided to limit the stroke of the two flexible flaps 108 of a double flapper valve 106, to keep the double flapper valve 106 from opening too far and to improve the dynamic response of the flaps 108, and hence the dynamic response of the double flapper valve assembly 100. The stroke of each of the flexible flaps 108 is defined herein as the difference between a first position and a second position of the flaps 108. The first position of the flaps 108 is where the wings 108b (described in detail below) of the flaps 108 are in the same plane as the rest of the double flapper valve 106 and the second position of the flaps 108 is where wings 108b (described in detail below) are in contact with respective stoppers 103.

The stoppers 103 slope downward as each stopper 103 extends beneath a position where a corresponding paddle portion (or wing) 108b of a flap 108 is disposed. It is to be noted that slope of each stopper 103 can be formed to have any desired angle that performs the intended purposes as described herein, and can be designed to provide the greatest benefits of fluid flow depending on the surrounding environment (i.e. the specific phaser) in which the double flapper valve assembly 100 will be used.

The stoppers 103 are configured to, in this example embodiment, slope in opposite directions with respect to each other such that they correspond with the wings 108b of the flaps 108, as described above and illustrated in FIG. 3.

A pair of protrusions 107a and 107b can be formed to extend outward from opposite ends of the body 107. These protrusions 107a and 107b extend outward from the body 107 in a direction toward the second housing portion 102b to receive each of the components of the double flapper valve 100.

The double flapper valve 106 can include a pair of holes 112, which align with and receive the pair of protrusions 107a and 107b therethrough. The double flapper valve 106 can have the above described flaps 108 each formed therein similar to the way a peninsula extends from land, such that the wings 108b and sides of a stem 108a of each flap 108 are not in contact with the outer periphery (or ring) of the double flapper valve 106 but extend in the same plane as the rest of the flapper valve 106 when in their resting position. Therefore, only a root portion of the stem 108a is connected to the ring of the double flapper valve 106 (see FIG. 5A). The pair of flaps 108 are designed to permit high flow passage of oil through the valve assembly 100.

Still referring to FIG. 3, a valve seat 104 can be disposed over the double flapper valve 106, and can include a pair of openings 105 that are aligned adjacent to respective ones of the wings 108b of the flaps 108 to direct the flow of oil (fluid or other fluid) directly over the wings 108b of the flaps 108. The valve seat 104 can also include a pair of holes 112, which align with and receive the pair of protrusions 107a and 107b therethrough so that the valve seat 104 remains aligned with the double flapper valve 106.

As illustrated in this exemplary embodiment, a filter 110 can be provided adjacent to the valve seat 104 at a side thereof opposite the side in which the double flapper valve 106 is disposed. The filter 110 can provide the benefit of preventing unwanted particles and/or other contaminants from entering the double flapper valve assembly 100. The filter 110 can include a mesh portion (not illustrated) at the center thereof. However, other forms of a filter 110 that provide the intended purposes as described herein can alternatively be implemented. The filter 110 can also include a pair of holes 112, which align with and receive the pair of protrusions 107a and 107b therethrough to keep the filter 110 in alignment with the other components of the double flapper valve assembly 100.

As described above with reference to FIG. 3, the stoppers 103 are illustrated to have a downward slope as they approach a corresponding wing 108b of each flap 108. This design of the slope of each stopper 103 acts to limit the stroke of the corresponding flap 108 of the double flapper valve 106, thus controlling the amount in which the double flapper valve 106 can open. Moreover, each stopper 103 preferably includes a double slope (see FIG. 4). A double slope formed in each stopper 103 can provide a greater level of control regarding an amount of oil flow through the double flapper valve assembly 100. The double slope design of the stoppers 103 can also improve the dynamic response of the flaps 108, as well as significantly reducing stress that otherwise occurs mostly at the root of each stem 108a of the flaps 108, as will be described in more detail below with reference to FIGS. 5A and 5D.

Figure 4A:
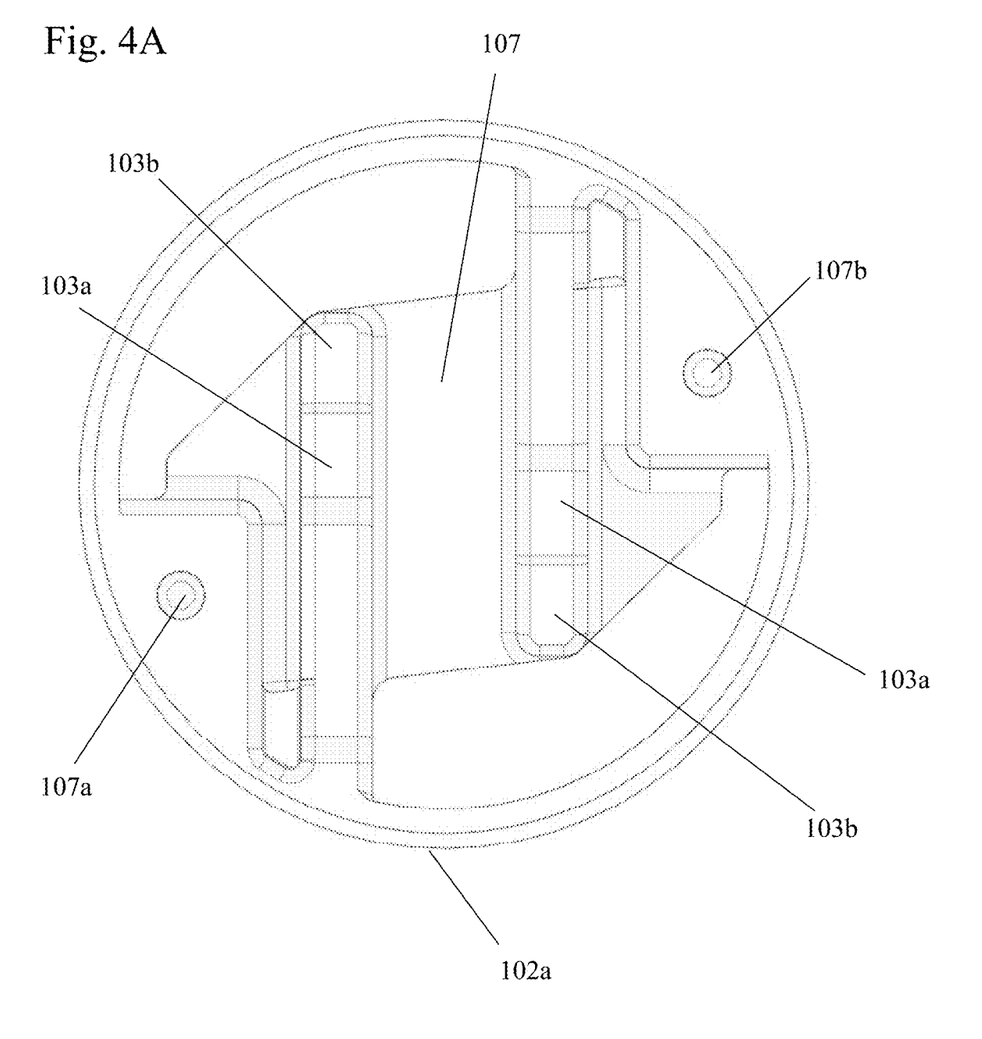
FIG. 4A illustrates a top view of a first housing portion of the double flapper valve assembly with a double slope stopper according to the exemplary embodiment of FIG. 1.

FIG. 4A illustrates a top view of the first portion of the housing 102a. As illustrated, the body 107 is overmolded together with the first portion of the housing 102a and can integrally include the two stoppers 103 formed in parallel with each other and aligned across a width of the body 107. Both stoppers 103 are formed to slope downward from one end to the other, while the slope of one stopper 103 is in a first direction and the slope of the other stopper 103 is in the opposite direction. Moreover, each stopper 103 can include a first slope 103a and a second slope 103b. The first slope 103a of each stopper 103 begins at the outer periphery of the first portion of the housing 102a and slopes downward as the stopper extends toward the center of the first portion of the housing 102a. The second slope 103b includes a section that rises like a step from the first slope 103a, and then slopes downward to complete the stopper. The first slope 103a may be at an angle between 2-10 degrees and the second slope 103b may be at an angle of at least 2 degrees larger than the angle of the first slope 103a.

Figure 4B:
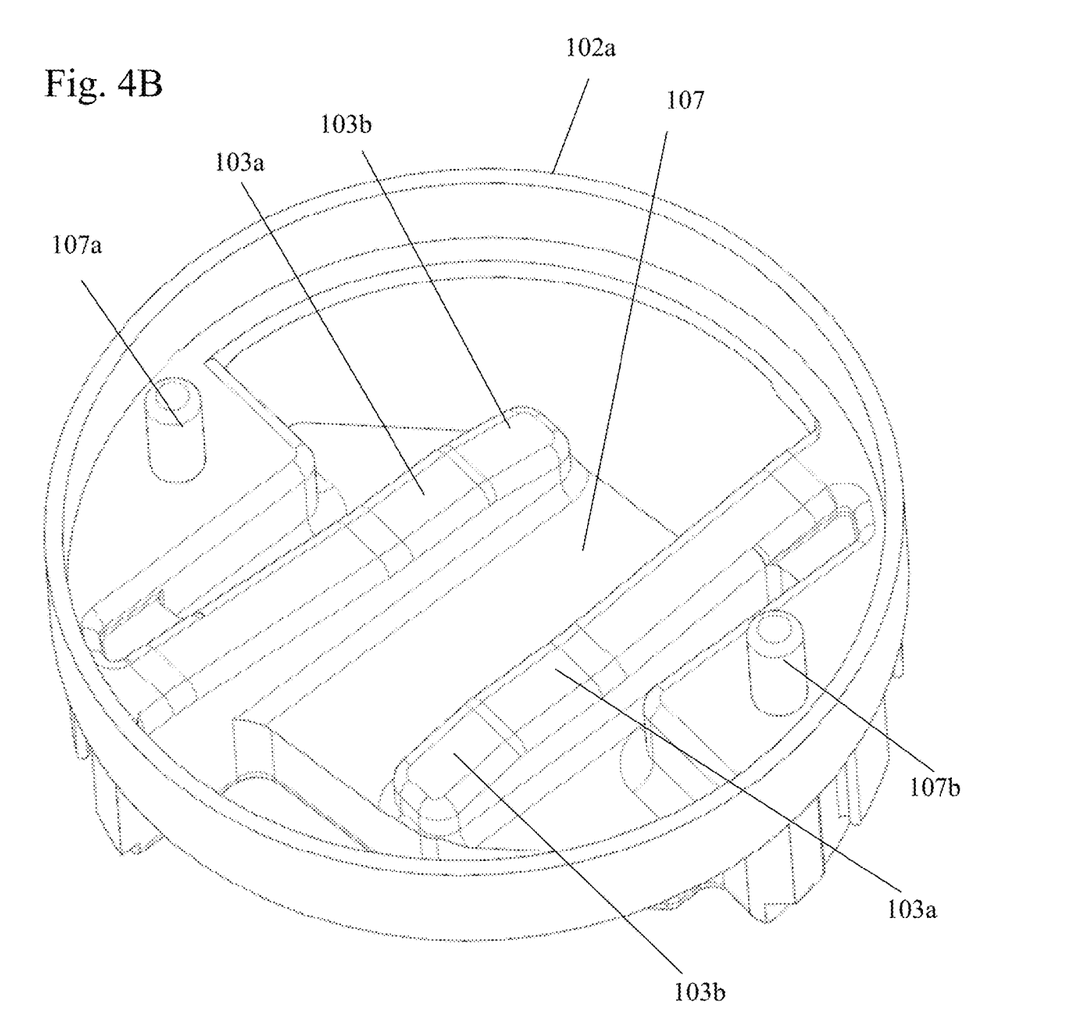
FIG. 4B illustrates a perspective view of the first housing portion illustrating the double slopes of the stopper according to the exemplary embodiment of FIGS. 1 and 4A.

FIG. 4B illustrates a top view of the first housing portion 102a with the body 107 and slopes 103 integrally formed therein. As illustrated here, the first slope 103a extends from the outer circumference of the first housing portion 102a inward while sloping downward towards a surface of the body 107. At a predetermined point, the second slope 103b begins by stepping up from a top surface of the first slope 103a and then continues to the end of the stopper 103 while sloping downward.

Figure 5A:
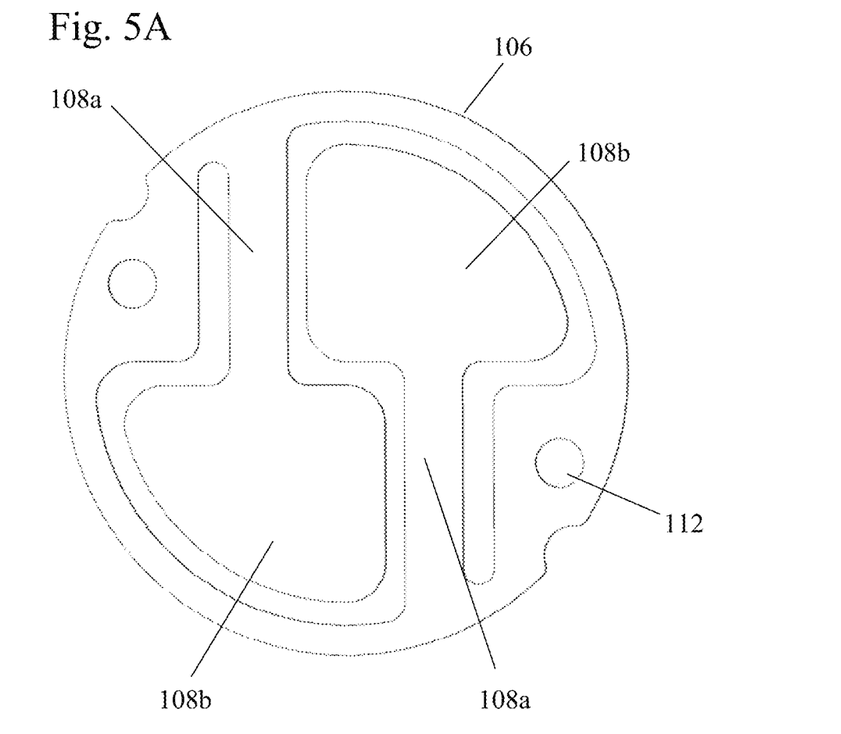
FIG. 5A illustrates a top view of a double flapper valve according to an exemplary embodiment of the present inventive concept.

FIG. 5A illustrates a top view of the double flapper valve 106 according to an exemplary embodiment illustrated in FIG. 3. As illustrated, the double flapper valve 106 can include two flaps 108, each flap 108 extending inward from a periphery (or ring portion) of the double flapper valve 106 along the stem portion 108a and having the wing 108b extending from the stem portion 108a. Both the stem portion 108a and the wing 108b are completely detached from any other portion of the double flapper valve 106 except at the root of the stem 108a, where each flap 108 is connected to the outer ring portion of the double flapper valve 106. Thus, the flaps 108 can dynamically flex such that a portion of the stem 108a and the wing 108b moves towards a corresponding stopper 103. The double flapper valve 106 also includes a pair of holes 112 that receive the extensions 107a and 107b therethrough.

Figure 5B:
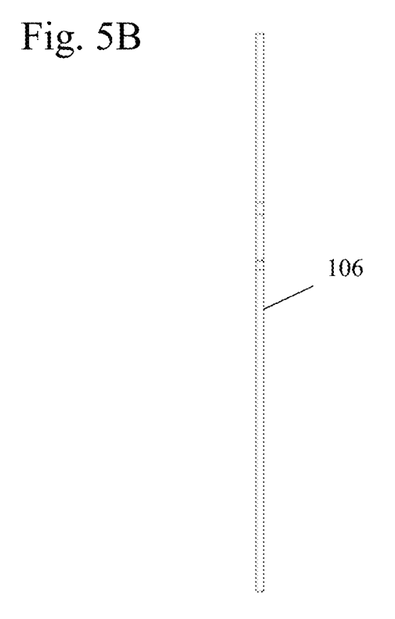
FIG. 5B illustrates a side view of the double flapper valve portion according to the exemplary embodiment of FIG. 5A.

FIG. 5B illustrates a side view of the double flapper valve 106.

Figure 5C:
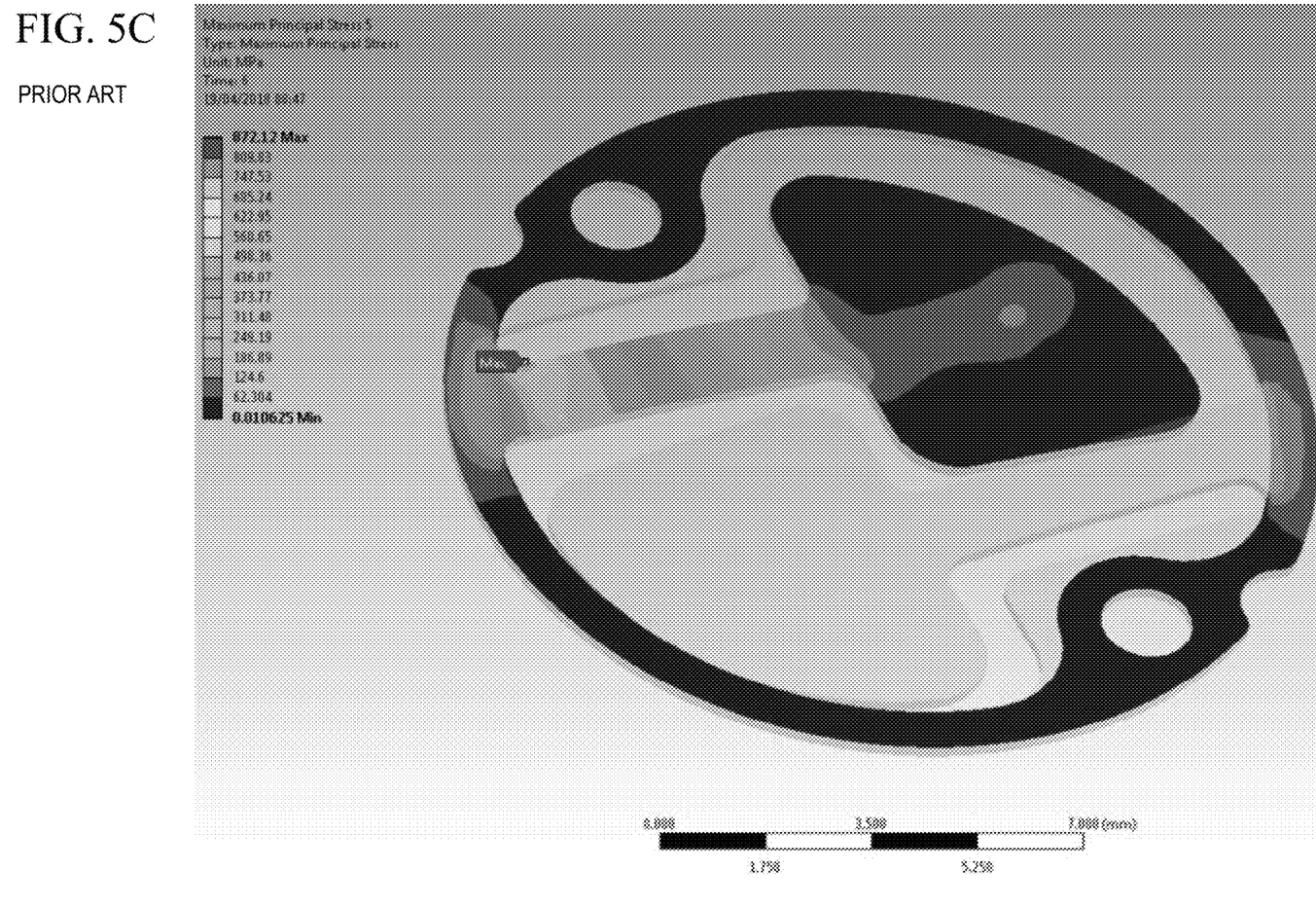
FIG. 5C illustrates stress on a flapper operating with a single slope stopper.
Figure 5D:
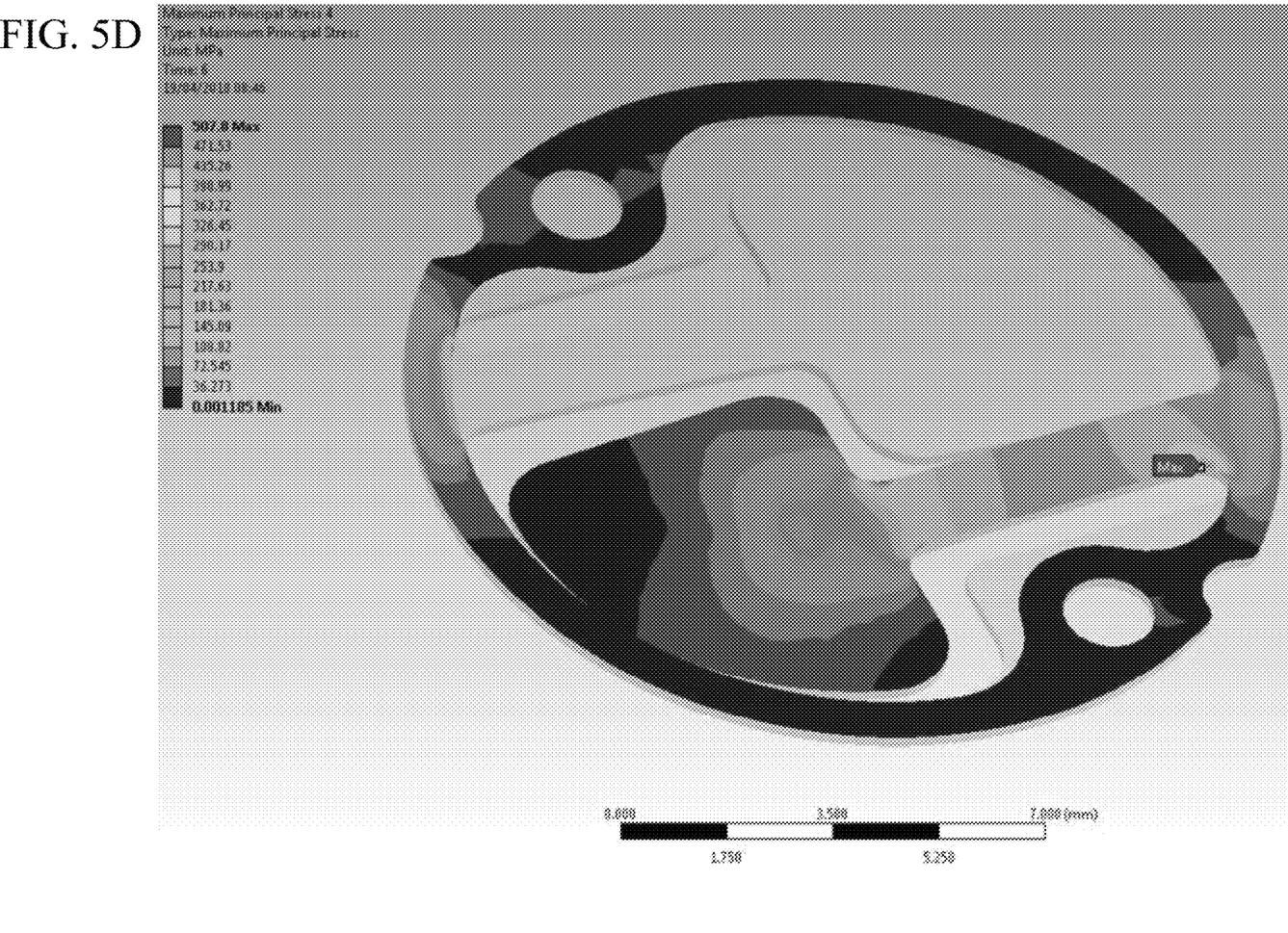
FIG. 5D illustrates stress on a flapper operating with the double sloped stopper, according to the exemplary embodiment of FIG. 4.

FIG. 5C illustrates the maximum principal stress that results in a flap 108 where a single slope stopper 103 is provided (conventional design). FIG. 5D, in comparison shows the maximum principal stress results through the flap 108 where a double slope stopper 103 is provided, as illustrated in FIG. 4. During tests performed, a majority of stress on the flap 108 while a single slope stopper 103 is used (as the flap 108 flexes to allow oil to flow therethrough), occurs at the root of the stem 108a of each flap 108. On average the amount of stress that occurs at the root of the stem 108a while using the single slope stopper 103 (left figure) is approximately 872 MPa. In contrast, where a double slope stopper 103 is used (right figure), the average amount of stress that occurs at the root of the stem 108a is approximately 507 MPa, while the remaining stress on the flap 108 is distributed along the stem 108a and partly into the wing 108b.

Figure 6A:
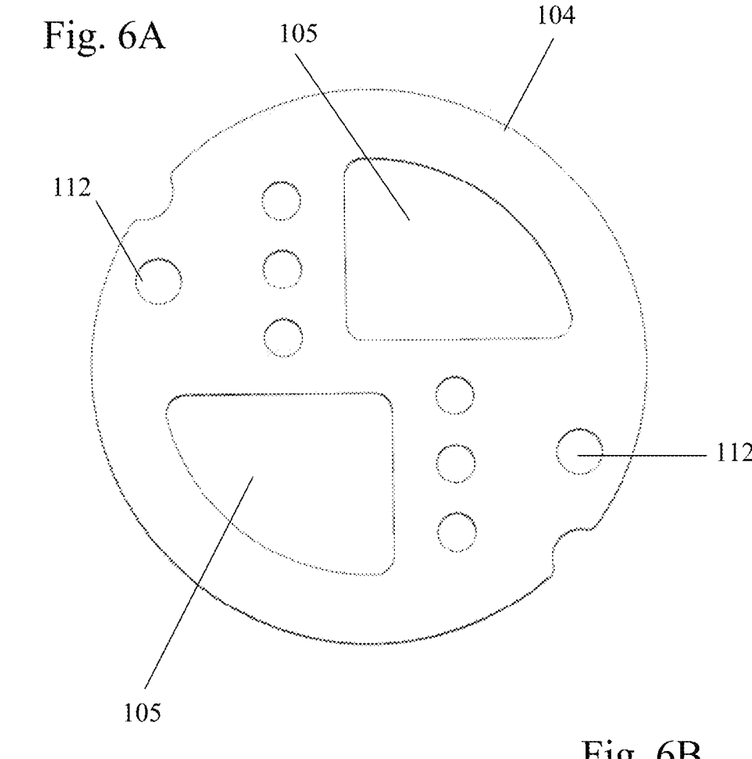
FIG. 6A illustrates a top view of a valve seat according to an exemplary embodiment of the present inventive concept.

FIG. 6A illustrates a top view of the seat valve 104 according to the exemplary embodiment as illustrated in FIG. 3. As illustrated here, the seat valve 104 can include a pair of openings 105 to allow the flow of oil therethrough to the wings 108b of each flap 108 positioned adjacent thereto. Each opening 105 can also be formed to coincide with the shape of the corresponding wing 108b of each flap 108 to direct the maximum flow of the oil to the wings 108b. The seat valve 104 can also include a pair of holes 112 that receive the extensions 107a and 107b, which provides to keep the seat valve 104 aligned with the other components of the double flapper valve assembly 100.

Figure 6B:
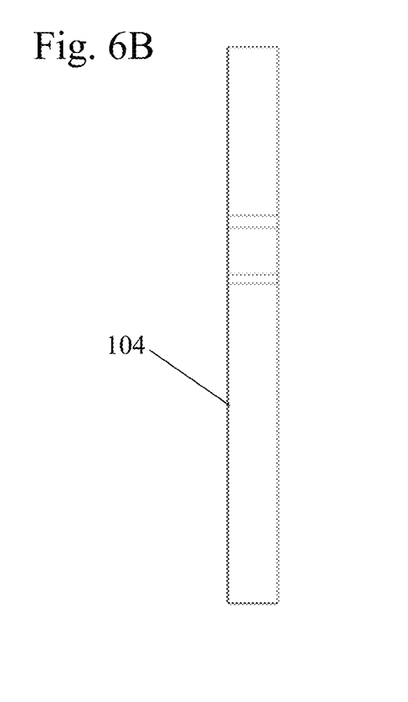
FIG. 6B illustrates a side view of the valve seat according to the exemplary embodiment of FIG. 6A.

FIG. 6B illustrates a side view of the seat valve 104 of FIG. 6A.

Figures 7A, 7B:
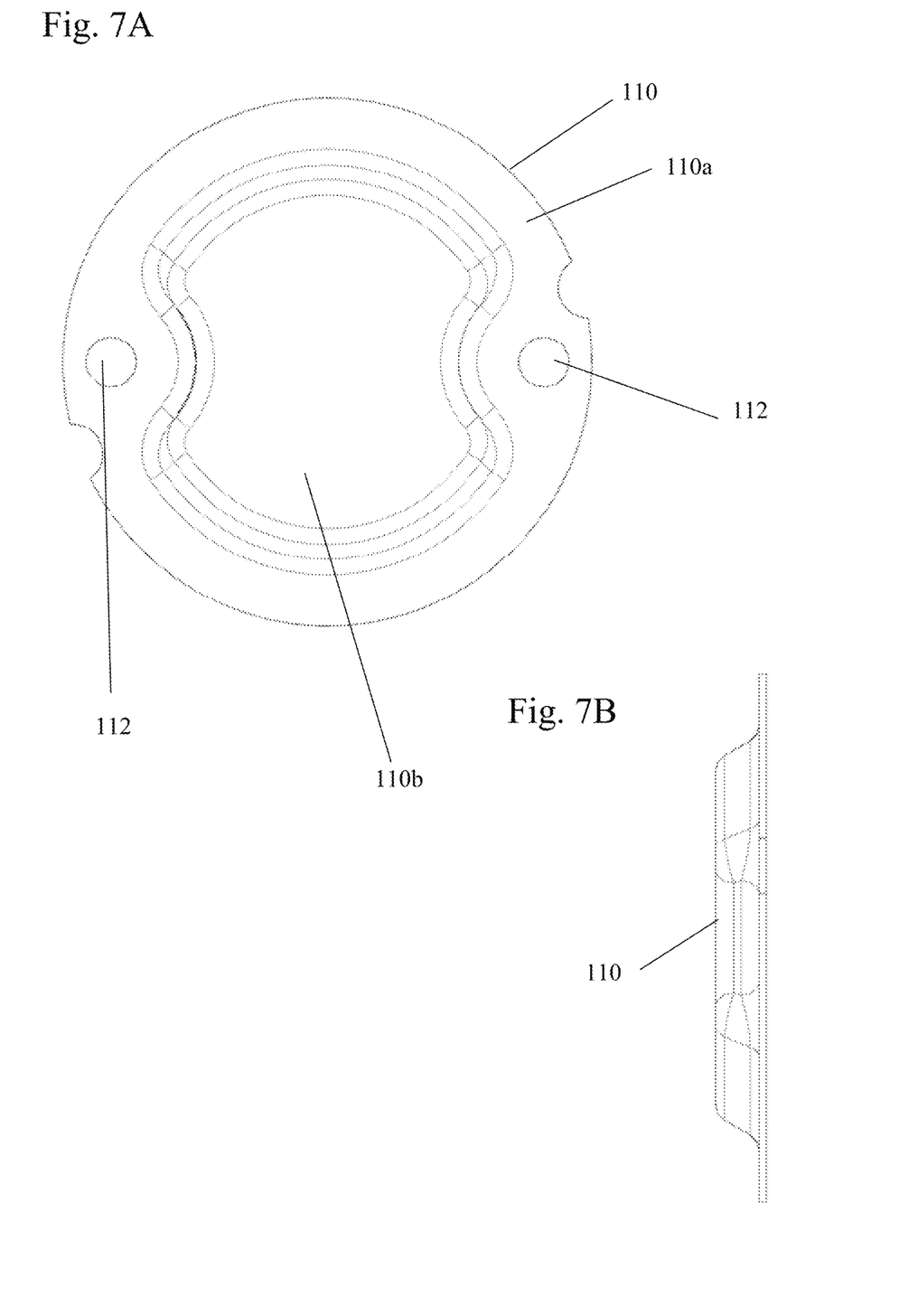
FIG. 7A illustrates a top view of a filter according to an exemplary embodiment of the present inventive concept.
FIG. 7B illustrates a side view of the filter according to an exemplary embodiment of FIG. 7A.

FIG. 7A illustrates a top view of a filter 110 according to the exemplary embodiment illustrated in FIG. 3. As illustrated here, the filter 110 can include circumferential outer periphery 110a and an inner portion 110b that protrudes inward from the outer periphery 110a. The inner portion 110b can include a perimeter with a hole in the center thereof to retain a mesh (not illustrated) therein to filter out particles and other contaminates from the oil that flows through the mesh and through the double flapper valve assembly 100. The filter can also include a pair of holes 112 that receive the extensions 107a and 107b therethrough, which keeps the filter 110 in alignment with the other components in the double flapper valve assembly 100.

FIG. 7B illustrates a side view of the filter 110 of FIG. 7A.

As described above, the double sloped stoppers 103 can limit the amount of movement of the corresponding flap 108, can better control the stress applied to the flaps 108 by redistributing the stress throughout the stem 108a and wing 108b of the flaps 108, and can improve the dynamic response of the flaps 108. The double sloped stoppers 103 can also better control the amount of oil that enters a variable camshaft timing phaser in which the double flapper valve assembly 100 is connected.

Figure 8:
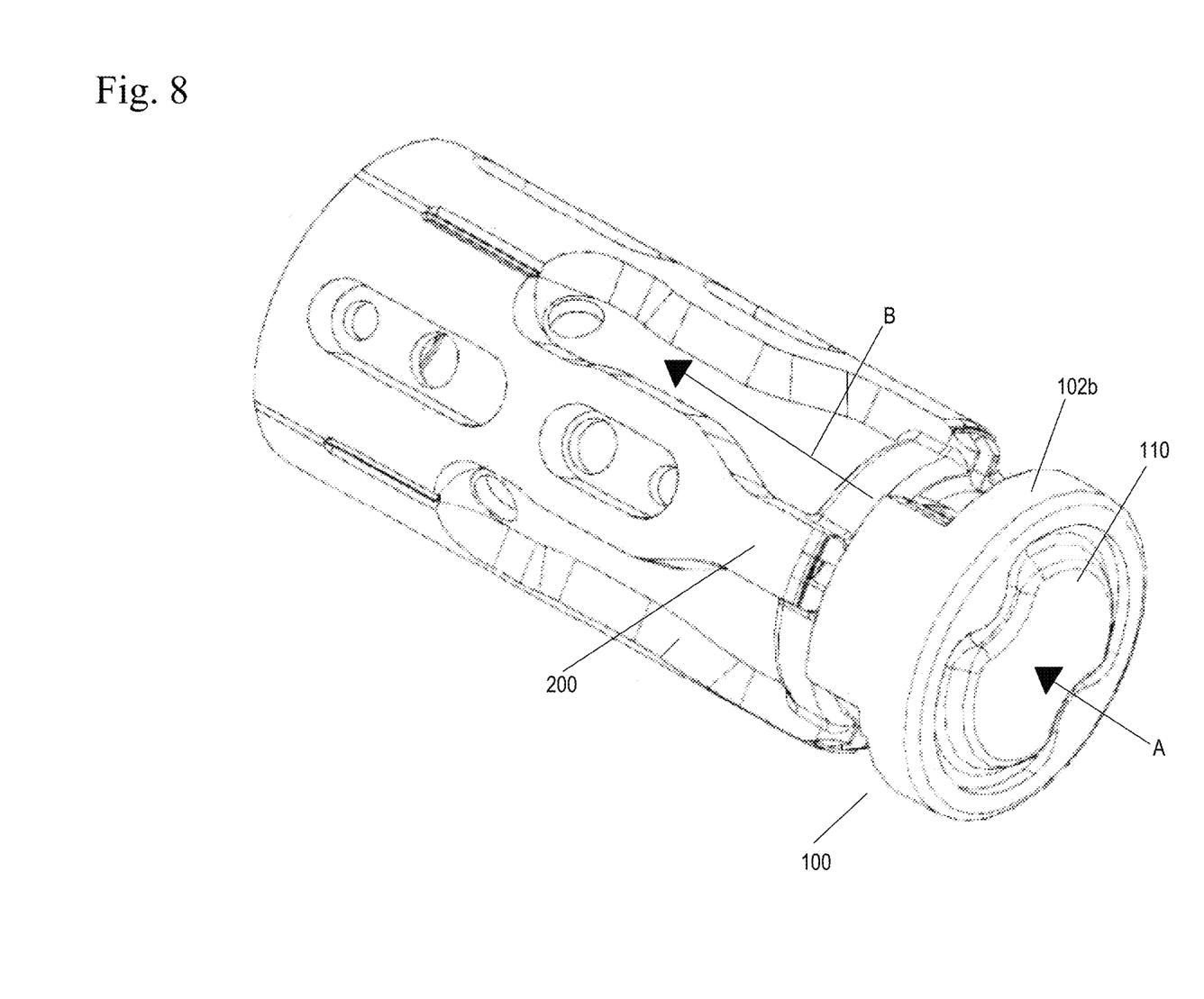
FIG. 8 illustrates a view of the double slope stopper double flapper valve assembled on a sleeve.

Referring to FIG. 8, the double flapper valve assembly 100 according to the exemplary embodiment of FIGS. 1-7B is illustrated to be assembled on a sleeve 200 of a control valve of a variable camshaft timing phaser. The sleeve 200 is also referred to as a sleeve overmold. The sleeve 200 can be made of steel, or other metal or materials that can provide the intended purposes of performing long-term variable camshaft timing of the variable camshaft timing phaser. Although not illustrated in order to provide brevity to this application, the top portion of the sleeve 200 is generally formed with grooves to receive the double slope stoppers 103 of the double flapper valve assembly 100. Arrow A illustrates the flow of oil entering the check valve assembly 100 (generally received from a camshaft nose) through the filter 110. Arrow B illustrates the flow of oil coming from the check valve assembly 100 to a common passage of the sleeve overmold 200.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A check valve to control flow of a fluid into a variable camshaft timing phaser, the check valve comprising:
   a housing;
   a flapper valve coupled to the housing and having at least two flexible flaps, each flap including a wing portion;
   a valve seat coupled to the housing and spaced apart from the flapper valve, the valve seat including at least two openings that align respectively with the at least two wings of the at least two flaps;
   a stopper piece coupled to the housing and spaced apart from both the flapper valve and the valve seat such that the flapper valve is disposed between the valve seat and the stopper piece, the stopper piece including at least two stoppers each having a sloped configuration with a first sloped surface and a second sloped surface, the second sloped surface being raised from and extending from the first sloped surface to a position adjacent a respective wing of the at least two flexible flaps such that the second sloped surface of each stopper contacts the respective wing after a predetermined amount of movement of the at least two flexible flaps.

2. The check valve of claim 1, wherein the stopper piece is integrally formed with the housing through overmolding.

3. The check valve of claim 1, further comprising a filter coupled to the flapper valve.

4. The check valve of claim 3, wherein the filter is made of steel.

5. The check valve of claim 1, wherein the housing is made by overmolding.

6. The check valve of claim 1, wherein the flapper valve is made of steel.

7. The check valve of claim 1, wherein stroke of the flaps of the flapper valve is at most 1.3 mm.

8. The check valve of claim 1, wherein a total oil flow through the check valve is at least 40 $mm^2$.

9. The check valve of claim 1, wherein the check valve is received in a sleeve of a control valve of the variable camshaft timing phaser.

* * * * *